United States Patent
Steck et al.

(10) Patent No.: US 12,037,803 B2
(45) Date of Patent: Jul. 16, 2024

(54) INSERTABLE COUPLING FOR FRAME ELEMENTS OF A SCAFFOLDING

(71) Applicant: PERI SE, Weissenhorn (DE)

(72) Inventors: Tobias Steck, Weissenhorn (DE); Andre Gaiser, Weissenhorn (DE)

(73) Assignee: PERI SE, Weissenhorn (DE)

( * ) Notice: Subject to any disclaimer, the term of this patent is extended or adjusted under 35 U.S.C. 154(b) by 0 days.

(21) Appl. No.: 16/510,592

(22) Filed: Jul. 12, 2019

(65) Prior Publication Data
US 2020/0018080 A1    Jan. 16, 2020

(30) Foreign Application Priority Data
Jul. 12, 2018   (DE) ..................... 20 2018 104 007.3

(51) Int. Cl.
    *E04G 7/02*   (2006.01)
    *E04G 7/20*   (2006.01)
    *F16B 7/04*   (2006.01)

(52) U.S. Cl.
    CPC .............. *E04G 7/02* (2013.01); *E04G 7/20* (2013.01); *F16B 7/042* (2013.01)

(58) Field of Classification Search
    CPC ......... Y10T 24/45262; Y10T 24/44026; Y10T 403/58; Y10T 403/581; E04G 7/02; E04G 7/042; E04G 7/20; F16B 45/02; F16B 13/0808; F16B 7/042
    USPC .......................................................... 411/340
    See application file for complete search history.

(56) References Cited

U.S. PATENT DOCUMENTS

| | | | | |
|---|---|---|---|---|
| 325,221 A * | 8/1885 | Wright | ............... | F16B 13/0808 24/100 |
| 775,200 A * | 11/1904 | Webber | ............... | F16B 13/0808 403/379.2 |
| 1,724,003 A * | 8/1929 | Chamberlain | .......... | F16B 45/02 70/459 |
| 2,077,825 A * | 4/1937 | Davidson | ................ | B60D 1/02 278/96 |
| 2,180,558 A * | 11/1939 | Stastny | .................... | B60D 1/02 278/96 |
| 2,224,522 A * | 12/1940 | Peterson | .................. | B60D 1/02 280/515 |
| 2,547,326 A * | 4/1951 | Kellogg | ................ | B60D 1/025 24/DIG. 35 |
| 3,004,784 A * | 10/1961 | Selby | ....................... | E04G 7/20 411/398 |

(Continued)

FOREIGN PATENT DOCUMENTS

| CN | 101736896 A | 6/2010 |
|---|---|---|
| CN | 102094515 A | 6/2011 |

(Continued)

*Primary Examiner* — Daniel P Cahn
*Assistant Examiner* — Shiref M Mekhaeil
(74) *Attorney, Agent, or Firm* — SLEMAN & LUND LLP

(57) ABSTRACT

A coupling pin clip for a coupling piece for the connection of two components that are inserted between them. To affix the insertable coupling at the ends of the coupling piece, a pin is insertable both through a hole of the component and through a hole of the coupling piece. The coupling pin clip is U-shaped, the legs of which have a distance from each other that corresponds to the distance of the two holes in the coupling piece. Furthermore, the coupling pin clip comprises a tipping finger articulated at one end of the coupling pin clip.

11 Claims, 6 Drawing Sheets

(56) References Cited

U.S. PATENT DOCUMENTS

| | | | | |
|---|---|---|---|---|
| 3,011,801 | A * | 12/1961 | Neumann | B60D 1/02 411/347 |
| 3,279,302 | A * | 10/1966 | Modrey | F16B 21/12 411/350 |
| 3,554,318 | A * | 1/1971 | Knight | E06C 1/32 182/27 |
| 3,673,910 | A * | 7/1972 | Collister | F16B 21/12 411/345 |
| 3,752,262 | A * | 8/1973 | Helms | E04G 5/14 182/178.1 |
| 3,861,267 | A * | 1/1975 | Collister | F16B 41/002 411/345 |
| 3,865,407 | A * | 2/1975 | Klassen | B60D 1/02 280/515 |
| 4,087,112 | A * | 5/1978 | Lee, Jr. | B60D 1/02 D8/382 |
| 4,291,784 | A * | 9/1981 | Moses | E04G 7/20 182/117 |
| 4,470,574 | A * | 9/1984 | Jackson | E04G 11/48 403/49 |
| 4,526,396 | A * | 7/1985 | Mayer | B60D 1/02 280/515 |
| 4,555,125 | A * | 11/1985 | Goodlove | B60D 1/02 280/515 |
| 4,586,844 | A * | 5/1986 | Hammonds | E04G 7/20 182/178.3 |
| 4,597,472 | A * | 7/1986 | Hjelm | E04G 7/302 403/348 |
| 4,749,060 | A * | 6/1988 | Vandelinde | E04G 3/30 182/113 |
| 4,830,144 | A * | 5/1989 | Werner | E04G 1/14 182/119 |
| 4,949,525 | A * | 8/1990 | Weaver | E04H 12/32 403/379.3 |
| 5,078,534 | A * | 1/1992 | White | F16B 7/042 403/379.3 |
| 5,112,155 | A * | 5/1992 | Jackson | E04G 7/305 403/49 |
| 5,215,418 | A * | 6/1993 | Trainer | F16B 13/0808 411/340 |
| 5,226,767 | A * | 7/1993 | Foerster, Jr. | F16B 35/00 411/340 |
| 5,285,869 | A * | 2/1994 | Rock | E04G 7/301 403/373 |
| 5,367,852 | A * | 11/1994 | Masuda | E04G 1/06 403/174 |
| 5,400,870 | A * | 3/1995 | Inoue | E04G 7/20 182/178.6 |
| 5,507,611 | A * | 4/1996 | Collister | F16B 13/0808 411/340 |
| 5,983,686 | A * | 11/1999 | Lee | A45F 5/02 70/459 |
| 6,029,774 | A * | 2/2000 | Cothern | E06C 7/188 182/214 |
| 6,145,866 | A * | 11/2000 | Peter | B60D 1/025 403/325 |
| D536,236 | S * | 2/2007 | Recknagel | D8/341 |
| D570,257 | S * | 6/2008 | VanderBurgh | D12/162 |
| 7,644,896 | B1 * | 1/2010 | Niner | B25B 11/002 248/431 |
| 8,136,633 | B2 * | 3/2012 | Rogers | E04G 7/32 182/178.1 |
| 8,201,844 | B1 * | 6/2012 | Smoot | B60D 1/025 403/324 |
| 9,321,316 | B1 * | 4/2016 | Beal | B60D 1/52 |
| 9,719,267 | B2 * | 8/2017 | Rogers | E04G 7/301 |
| 10,190,326 | B2 * | 1/2019 | Mikic | E04G 5/061 |
| 10,890,204 | B1 * | 1/2021 | Vela | F16B 21/12 |
| 2004/0050621 | A1 * | 3/2004 | Masino | E04G 1/154 182/119 |
| 2005/0085835 | A1 * | 4/2005 | Rennich | A61B 17/122 606/157 |
| 2006/0186639 | A1 * | 8/2006 | Rosario | B60D 1/58 280/507 |
| 2010/0025556 | A1 * | 2/2010 | Rogers | E04G 7/301 248/296.1 |
| 2011/0073821 | A1 * | 3/2011 | Nirenberg | B60S 9/14 254/420 |
| 2016/0305152 | A1 * | 10/2016 | Kozyra | E01F 15/0461 |
| 2016/0346149 | A1 * | 12/2016 | Jackson | A61G 7/008 |
| 2018/0361188 | A1 * | 12/2018 | Rexroad | F16B 7/185 |
| 2019/0169934 | A1 * | 6/2019 | Adams | A62B 35/0037 |

FOREIGN PATENT DOCUMENTS

| | | | |
|---|---|---|---|
| CN | 103410304 A | 11/2013 | |
| CN | 203641221 U | 6/2014 | |
| DE | 816453 C | 10/1951 | |
| DE | 6603798 U | 11/1969 | |
| DE | 8902479 U1 | 5/1989 | |
| DE | 19841314 A1 | 4/2000 | |
| DE | 202018104006 U1 * | 8/2018 | E04G 5/16 |
| JP | 2000017834 A | 1/2000 | |
| JP | 2003328556 A * | 11/2003 | |
| JP | 2003328556 A | 11/2003 | |
| TW | 200743710 A | 12/2007 | |
| WO | 2017147005 A1 | 8/2017 | |

* cited by examiner

INSERTABLE COUPLING FOR FRAME ELEMENTS OF A SCAFFOLDING

FIELD OF THE INVENTION

The invention relates to an insertable coupling for frame elements of a stackable scaffolding.

BACKGROUND OF THE INVENTION

Such scaffolding frame individual elements are used for, among other things, enabling the construction of the required base framework from a few individual parts for a substructure for ceiling formwork. To do this, the frame elements must be safely and securely stackable on each other. To this end, they include vertical supports formed as a hollow profile having vertical posts attached thereto. A connection of frame elements can be completed using a connecting sleeve. Connecting sleeves serving as coupling pieces are thus inserted in the one vertical post of a base frame and secured via a coupling pin with cotter pin in such a way that a portion of the connecting sleeve still protrudes from the vertical post in order to place a further vertical post thereon which is also secured via coupling pin and cotter pin. For a single connecting sleeve, two coupling pins are therefore required that are guided through aligning holes in the connecting sleeve and the vertical post and then each secured via cotter pin.

Couplers are also used for securing the connection, in which case the cotter pin is omitted. The coupler has a longitudinally extending pin which is guided through the openings in connecting sleeve and vertical post, wherein a section is provided that rests against the round outer circumferential side of the vertical post, surrounds it and either holds the coupler in its position by its own weight or is clamped to said outer circumference. In the case of a single connection coupling, two couplers are also needed here.

SUMMARY OF THE INVENTION

The object of the invention is to provide an insertable coupling for frame elements of a scaffolding or scaffolding frame that is easy to manipulate.

The coupling pin clip of the present invention is disclosed herein. It provides a new type of connection clip for, among other things, the scaffolding element mentioned above. Advantageous designs of the insertable coupling arise from the respective dependent claims.

The heart of the invention is coupling pin clip in the form of a U-shaped profile, the legs of which have a distance from each other corresponding to the distance of two bores in the coupling piece. Moreover, a tilting finger is articulated at one end of the coupling pin clip.

Thus, instead of a maximum of four elements being needed in the prior art for connecting two scaffolding frame elements for the coupling piece, only a single element, namely the coupling pin clip, is required. It is simultaneously inserted in all holes with which the coupling piece is to be affixed to the two scaffolding frame elements to be connected to each other.

The result is an increased assembly speed between the scaffolding components thanks to the improved ergonomics of the coupling pin system. The coupling pin clip is reliably self-securing and requires only a few manipulations to apply. An economical version is thus provided for an insertable coupling system. The length of the tilting finger is selected to be at least large enough that it cannot flip over within the tube and get jammed as a result.

The insertable coupling according to the invention for connecting scaffolding elements of a scaffolding as such is formed by a connecting adapter. This comprises:
 a coupling piece which is insertable between the scaffolding elements and
 a coupling pin clip as is described above.

The coupling piece of the connecting adapter having a centered circumferential abutment ring proves to be advantageous. This defines the insertion depth of the coupling piece on the first scaffolding frame tube. After the formation of the abutment, the second half of the coupling piece remains free for the placement of the second frame part.

Usually, the coupling piece is inserted in a hollow end of the vertical post. However, the present invention also functions in a configuration in which the coupling piece is placed at each of the two ends on the outer circumference on a tube end of a scaffolding frame. Of course, an intermediate solution is also feasible in which the one end of the coupling piece is inserted in a tube end and at the other end is placed on a tube end of the scaffolding frame.

BRIEF DESCRIPTION OF THE DRAWINGS

Additional details of the invention are described below with reference to an exemplary embodiment in conjunction with the accompanying drawing figures.

Shown in the drawing figures are.

DETAILED DESCRIPTION

Figure 1:
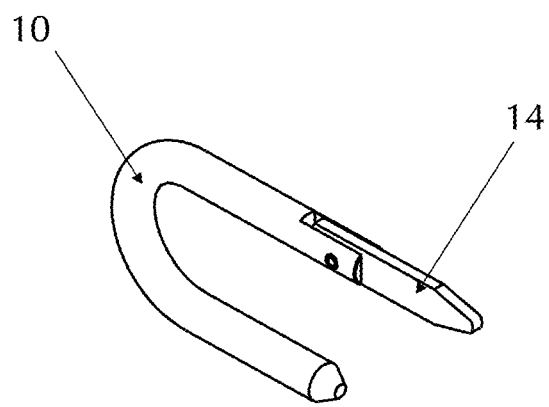
FIG. 1 shows the coupling pin clip according to the invention.
Figure 1:
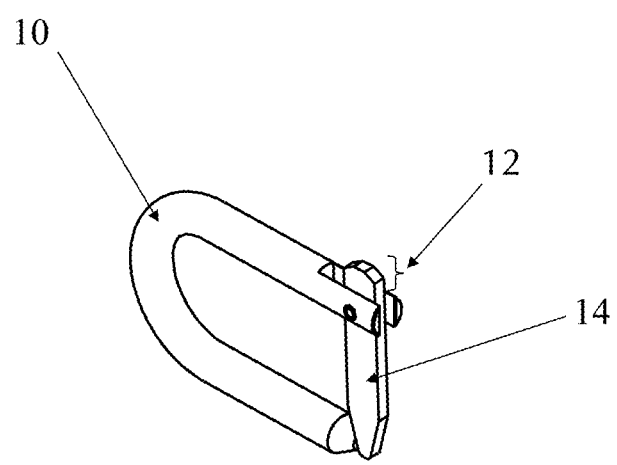

FIG. 1 shows the coupling pin clip 10 according to the invention made of a U-shaped profile, at the end of which a tilting finger 14 is articulated. The tilting finger is eccentrically articulated between two end pieces of the one leg of the U-shaped profile in such a way that it tends to tilt into a vertical position via its gravitational force. As is shown in the lower view of FIG. 1, an abutment collar 12 also referred to as an end portion is formed by the tilting finger 14 if it is transverse to the leg of the clip 10 on which it is articulated. This abutment collar 12 also referred to as an end portion in the upper part of the figure forms the locking abutment that in the installed state of the coupling pin clip 10 prevents removal or prevents components from falling out.

The length of the tilting finger is selected to be at least large enough that it cannot flip over within the tube and get jammed as a result.

As shown in the figure, the tilting finger 14 also has a length with which it, in the locked state, leads from one leg of the U-shaped profile to the other.

That leg at which the tilting finger 14 is articulated also exhibits a slightly larger length than the other leg, so that the tilting finger 14 in the locking state can fall down at approximately a 90 degree angle. This articulation angle may be supported by a conically tapered end of the tilting finger 14, which conical end can come to rest against a conical end of the free leg of the U-shaped profile. Furthermore, an insertion of the coupling pin clip 10 in said holes is made easier by the conical curve of, on the one hand, a leg of the U-shaped profile and, on the other hand, the end of the tilting finger 14.

Figure 2:
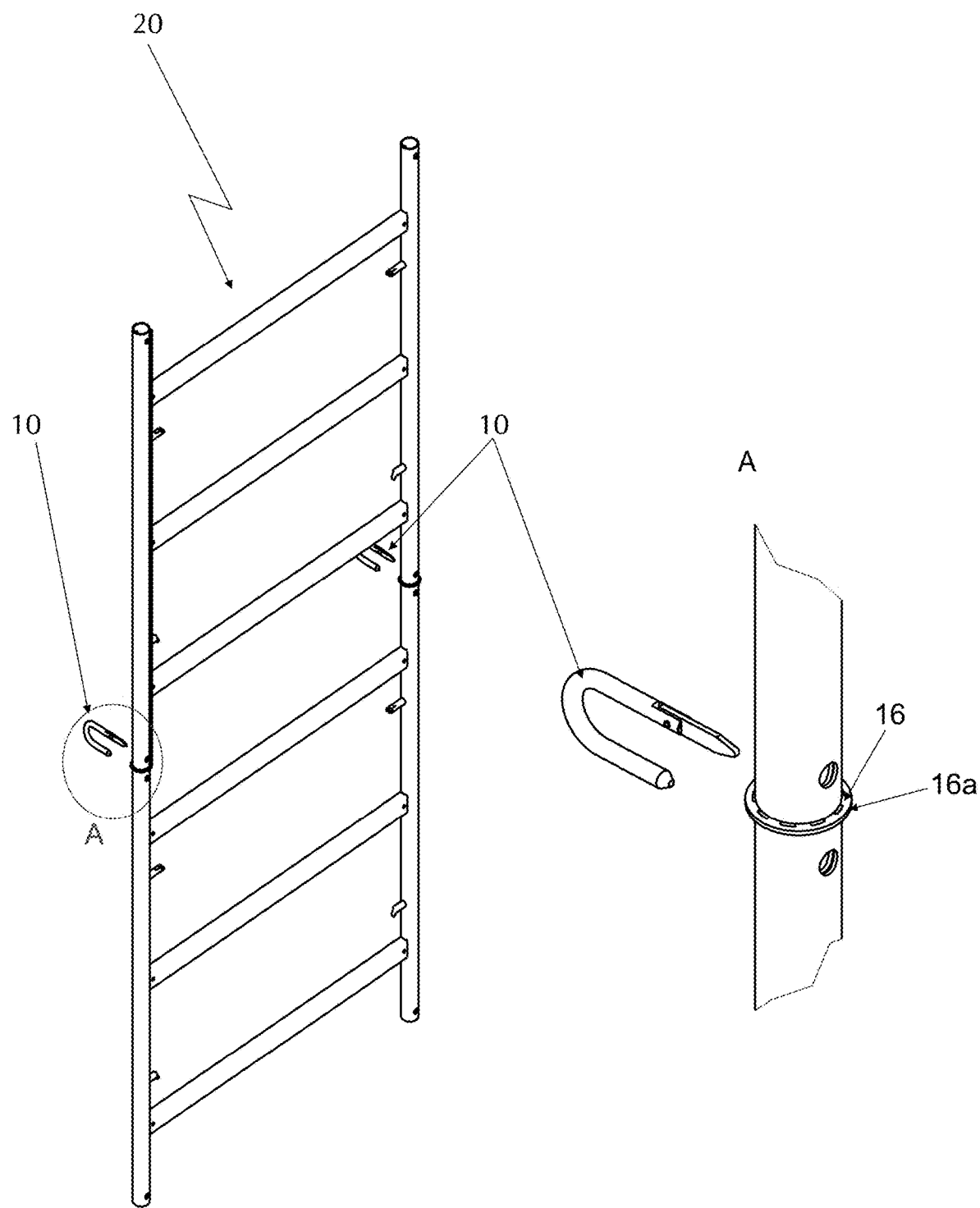
FIG. 2 shows the attachment of the coupling pin clip from FIG. 1 to a scaffolding frame.
Figure 3:
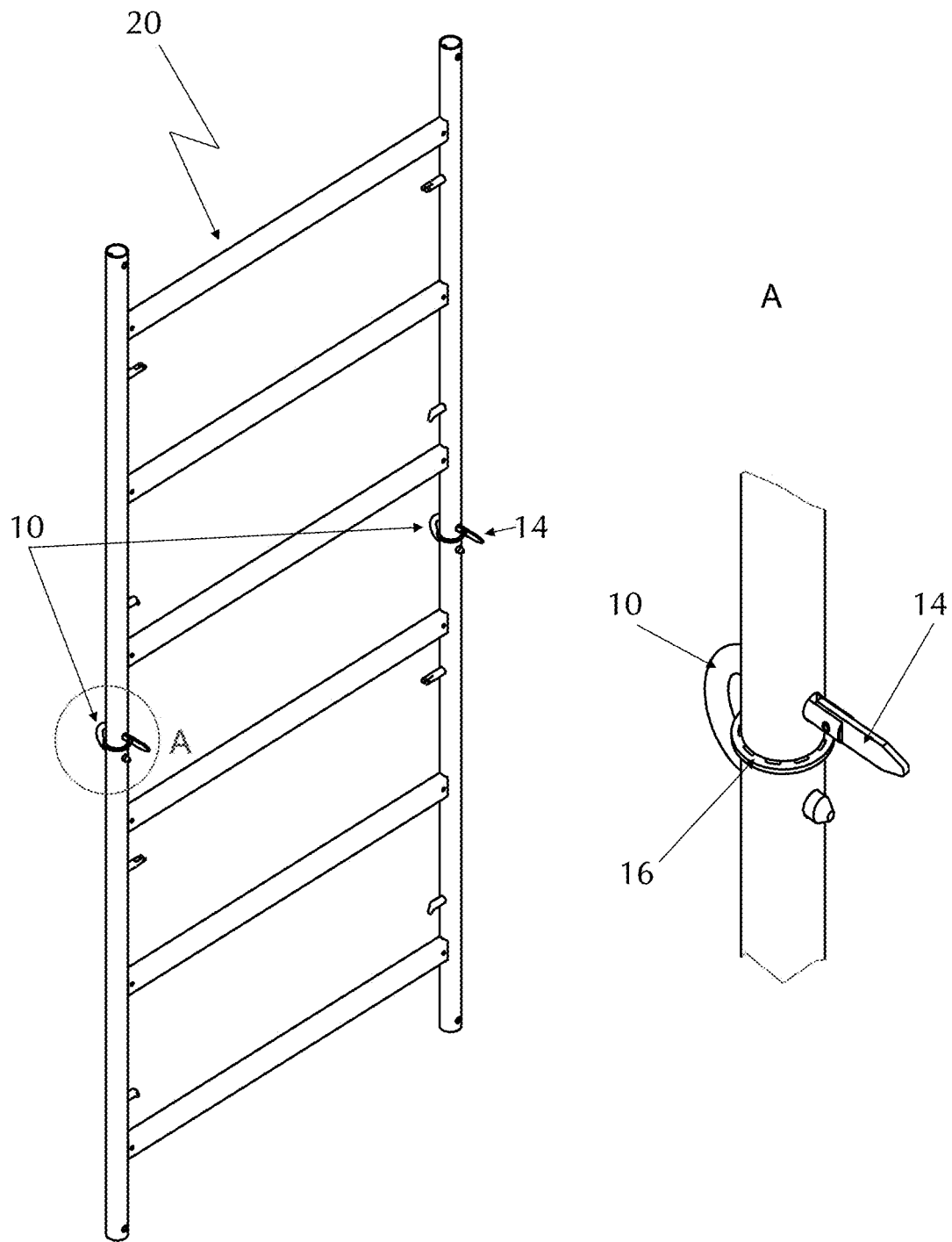
FIG. 3 shows a step subsequent to FIG. 2 for attachment of the coupling pin clip from FIG. 1.

FIG. 2 shows an attachment of the insertable coupling to a frame section 20 of a scaffolding. A coupling piece 16 having a centered circumferential abutment ring 16*a* (see Detail A) is inserted between the upright ends of vertical supports of the frame section 20. The coupling pin clip 10 is inserted through the holes at the ends of the respective frame section, and specifically in such a way that the tilting finger 14 is aligned parallel to the leg of the U-shaped profile holding it. FIG. 3 shows this arrangement in the form of an inserted coupling pin clip 10.

Figure 4:
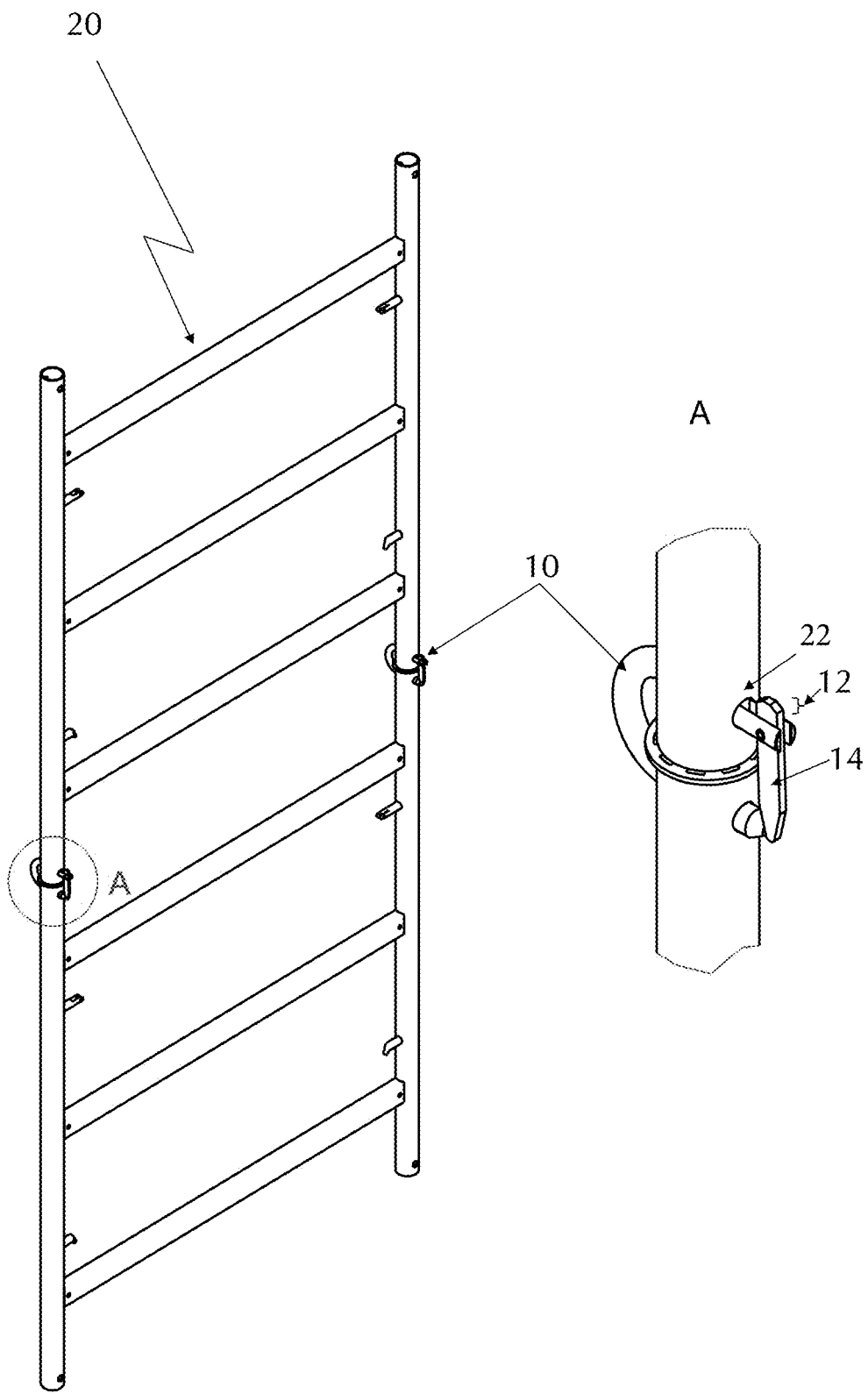
FIG. 4 shows a step subsequent to FIG. 3 for attachment of the coupling pin clip from FIG. 1.

Next, the tilting finger 14 will automatically drop into the vertical position shown in FIG. 4 via its gravitational force. The upper end of the tilting finger 14 thus forms an abutment collar 12 against the sheath 22 of the frame section 20, so that the coupling pin clip 10 in this shown position can no longer be removed from the holes and, thus, the connecting position.

Figure 5:
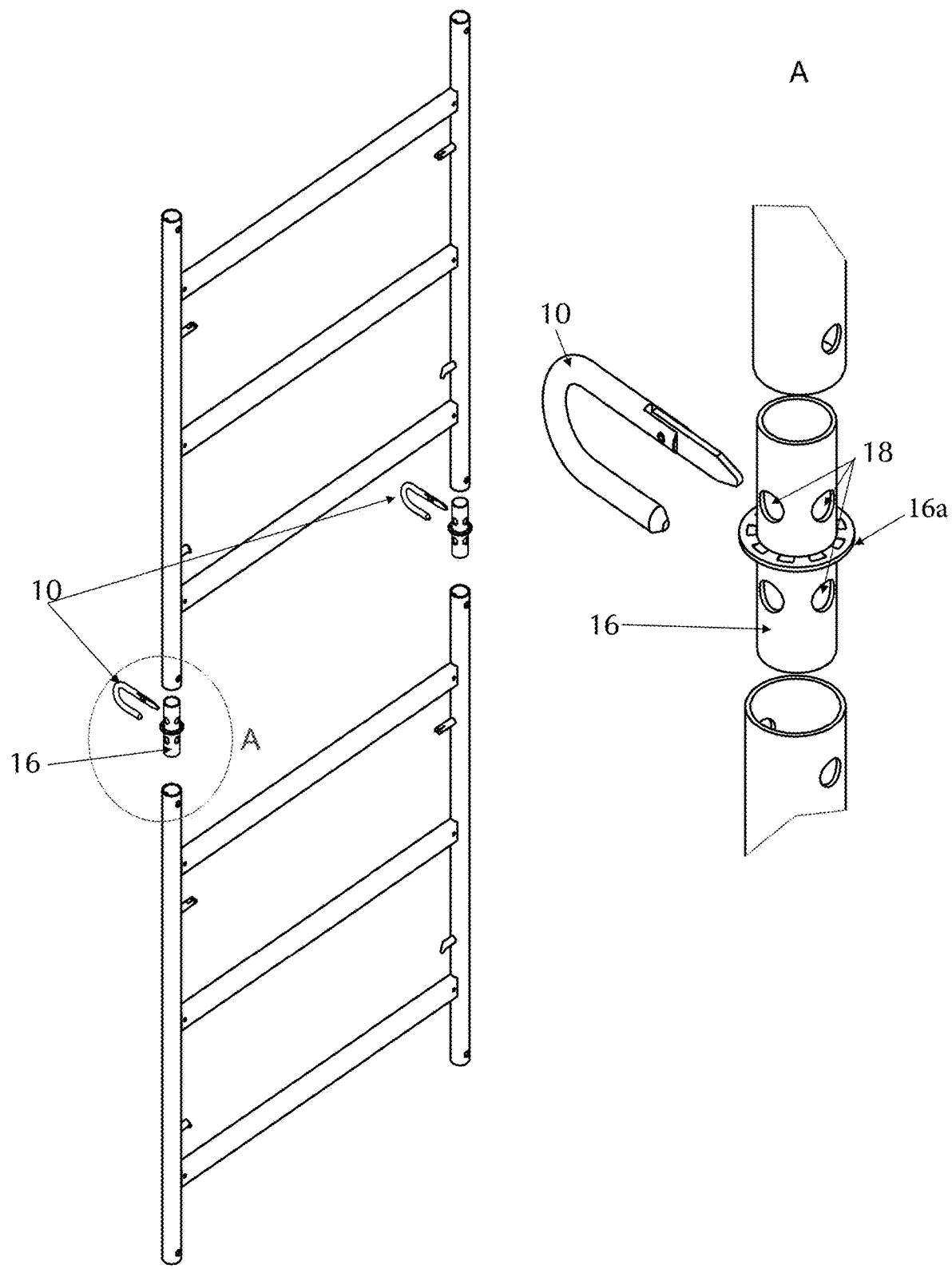
FIG. 5 shows the components of the insertable coupling in the unassembled state.

FIG. 5 shows the interplay between the holes of the coupling piece 16 and the holes of the frame section 20. The coupling piece is dimensioned somewhat smaller in its outer diameter, so that it is insertable in an open end of a frame section 20. All holes here are aligned in the insertion direction of the coupling pin. The central abutment ring 16*a* of the coupling piece 16 allows the coupling piece to be inserted a certain distance into the tube of the frame section 20. The same applies for the frame section 20 which can be placed on the coupling piece 16.

Figure 6A:
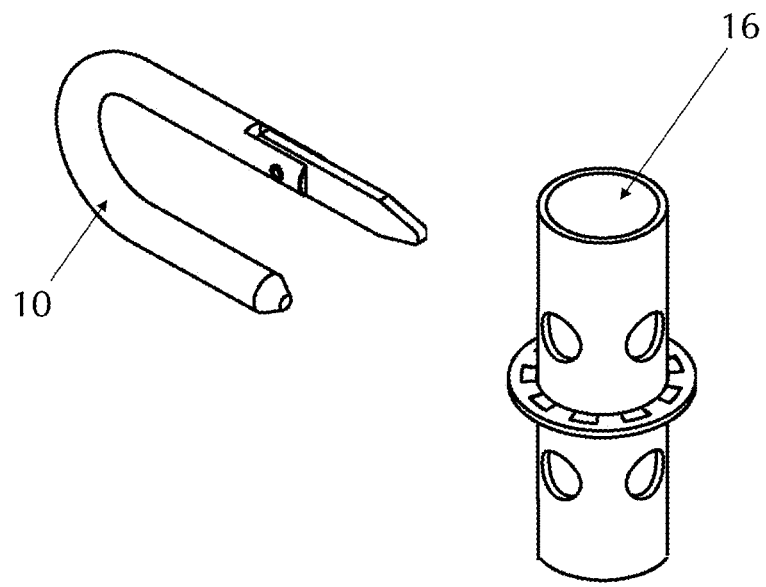
FIGS. 6A-C show an enlarged view of the interaction of coupling pin clip with a coupling piece according to the invention.
Figure 6B:
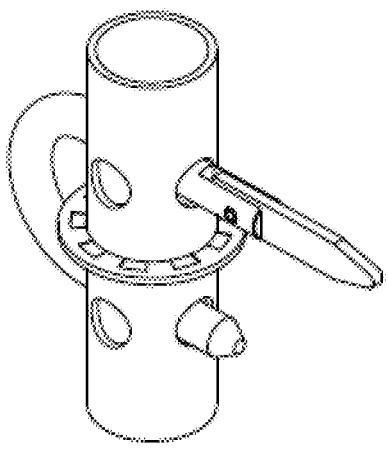
Figure 6C:
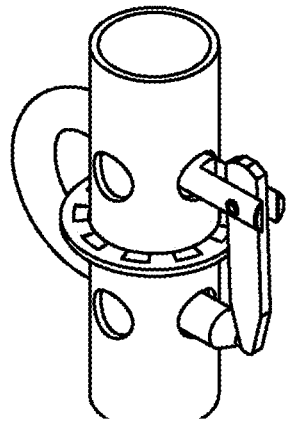

In FIG. 6, the interaction of insertion pin clip 10 and coupling piece 16 is shown. It corresponds to the procedural steps as they are outlined above in connection with FIGS. 2 to 4.

LIST OF REFERENCE CHARACTERS

10 Coupling pin clip
12 Abutment Collar also referred to as an end portion
14 Tilting finger
16 Coupling piece
16*a* Central abutment ring
20 Frame section of a scaffolding
22 Sheath

The invention claimed is:

1. A connecting adapter for connecting frame sections of a scaffolding, comprising:
   a coupling piece insertable between the frame sections, and
   a coupling pin clip having a U-shaped profile and legs, the legs having a distance from each other that corresponds to a distance between coupling piece holes defined by the coupling piece and being insertable into the coupling piece holes, the coupling pin clip having a tipping finger that is articulated at one end of the coupling pin clip and configured to rest against an other end of the coupling pin clip in a locked state, the tipping finger having a length at least large enough such that the tipping finger cannot flip over within the coupling piece,
   wherein in the locked state, an end portion of the tipping finger is configured to be able to abut against an outer surface of one of the frame sections such that the coupling pin clip cannot be removed from the holes defined by the one of the frame sections and thus the coupling pin clip cannot be removed from a connecting position,
   wherein a first leg of the legs about which the tipping finger articulates is longer than a second leg of the legs.

2. The connecting adapter according to claim 1, wherein the coupling piece has a centered circumferential abutment ring.

3. The connecting adapter of claim 1, wherein to affix the coupling pin clip at ends of the coupling piece the coupling pin clip is inserted both through a hole defined by one frame section of the two frame sections and through one of the coupling piece holes.

4. The connecting adapter of claim 1, wherein the length of the tipping finger is such that, in the locked state, leads from a first leg of the legs to a second leg of the legs.

5. The connecting adapter of claim 1, wherein the tipping finger has a conically tapered end.

6. The connecting adapter of claim 5, wherein at least one of the legs has a conical end such that the conically tapered end of the tipping finger comes to rest against the conical end in the locked state.

7. The connecting adapter of claim 1, wherein the articulated tipping finger is configured to rest against a portion of the second leg in the locked state.

8. The connecting adapter of claim 1, wherein the legs are unitary.

9. A connecting adapter for connecting frame sections of a scaffolding, comprising:
   a coupling piece insertable between the frame sections, and
   a coupling pin clip having a U-shaped profile and legs, the legs having a distance from each other that corresponds to a distance between coupling piece holes defined by the coupling piece, the coupling pin clip having a tipping finger that is articulated at one end of the coupling pin clip and configured to rest against an other end of the coupling pin clip in a locked state, the tipping finger having a length at least large enough such that the tipping finger cannot flip over within the coupling piece, wherein the legs are insertable into the coupling piece holes.

10. The connecting adapter of claim 9, wherein in the locked state, an end portion of the tipping finger is configured to be able to abut against an outer surface of one of the frame sections such that the coupling pin clip cannot be removed from holes defined by the frame section and thus the coupling pin clip cannot be removed from a connecting position.

11. A connecting adapter for connecting frame sections of a scaffolding, comprising:
   a coupling piece insertable between the frame sections, and
   a coupling pin clip having a U-shaped profile and legs, the legs having a distance from each other that corresponds to a distance between coupling piece holes defined by the coupling piece and being insertable into the coupling piece holes, the coupling pin clip having a tipping finger that is articulated at one end of the coupling pin clip and configured to rest against an other end of the coupling pin clip in a locked state, the tipping finger having a length at least large enough such that the tipping finger cannot flip over within the coupling piece, wherein in the locked state, an end portion of the tipping finger is configured to be able to abut against an outer surface of one of the frame sections such that the coupling pin clip cannot be removed from the holes defined by the frame section and thus the coupling pin clip cannot be removed from a connecting position, wherein the tipping finger tilts into a vertical position via gravitational force.

\* \* \* \* \*